Sept. 25, 1923.
H. S. HAMILTON
APPARATUS AND METHOD FOR MEASURING TRANSMISSION
Filed Dec. 5, 1921 2 Sheets-Sheet 1
1,468,704
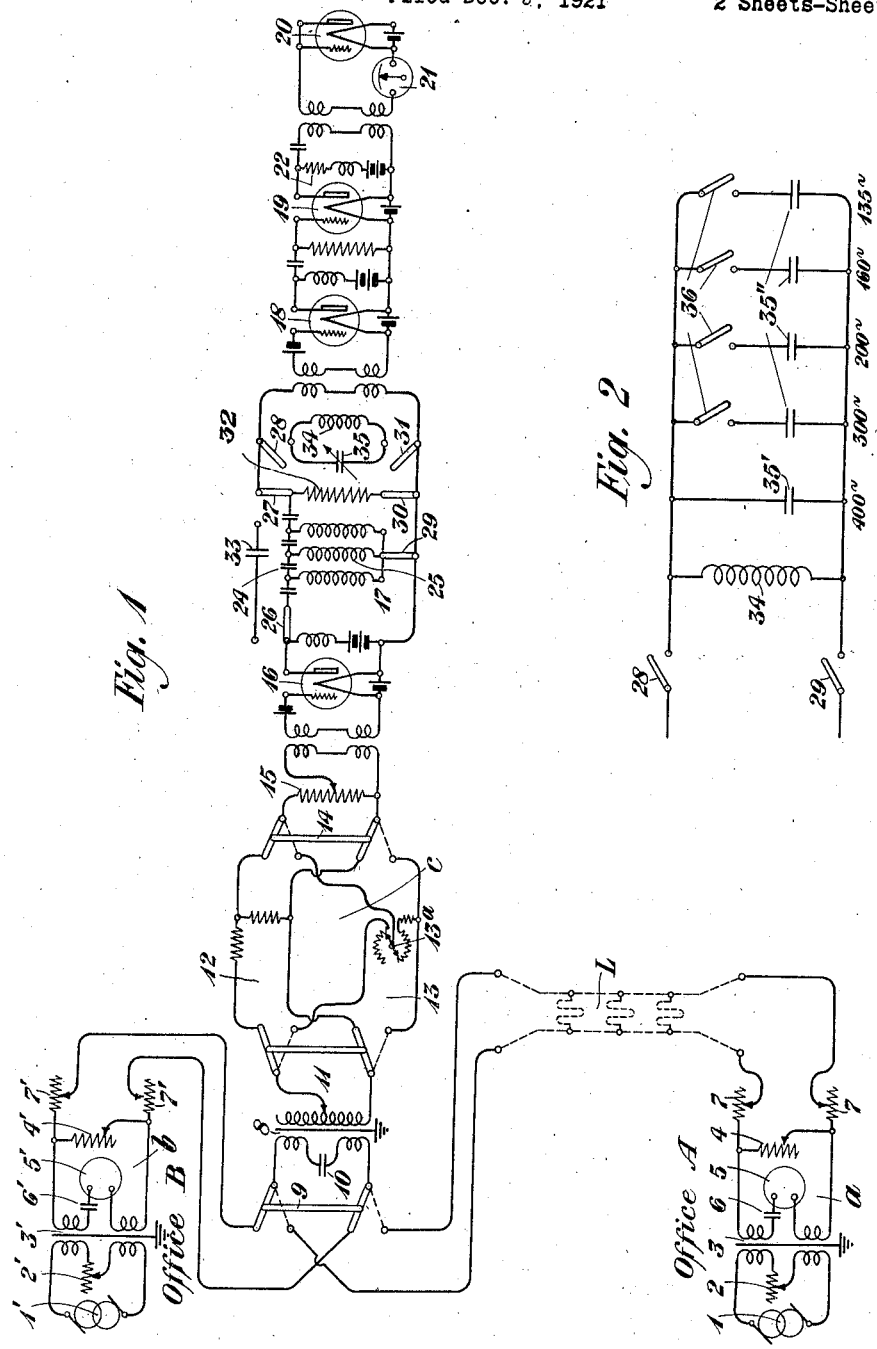
INVENTOR
H. S. Hamilton
BY
ATTORNEY INVENTOR
H. S. Hamilton
BY
ATTORNEY Patented Sept. 25, 1923.

1,468,704

UNITED STATES PATENT OFFICE.

HAROLD S. HAMILTON, OF NEW YORK, N. Y., ASSIGNOR TO AMERICAN TELEPHONE AND TELEGRAPH COMPANY, A CORPORATION OF NEW YORK.

APPARATUS AND METHOD FOR MEASURING TRANSMISSION.

Application filed December 5, 1921. Serial No. 520,054.

*To all whom it may concern:*

Be it known that I, HAROLD S. HAMILTON, residing at New York, in the county of Bronx and State of New York, have invented certain Improvements in Apparatus and Methods for Measuring Transmission, of which the following is a specification.

The principal object of my invention is to provide a new and useful method and appropriate apparatus for measuring the transmission efficiency of a piece of apparatus at particular frequencies for which such measurements may be desired. Another object of my invention is suitably to provide that in making such measurements there shall be protection from false effects that might be occasioned by the introduction of currents of extraneous frequencies. These and other objects of my invention will become apparent on consideration of a limited number of specific examples which I will now describe to illustrate the principle of the invention. It will be understood that the definition of the invention will be given in the appended claims and that the following description will apply specifically to these illustrative examples given thereunder.

Figure 3:
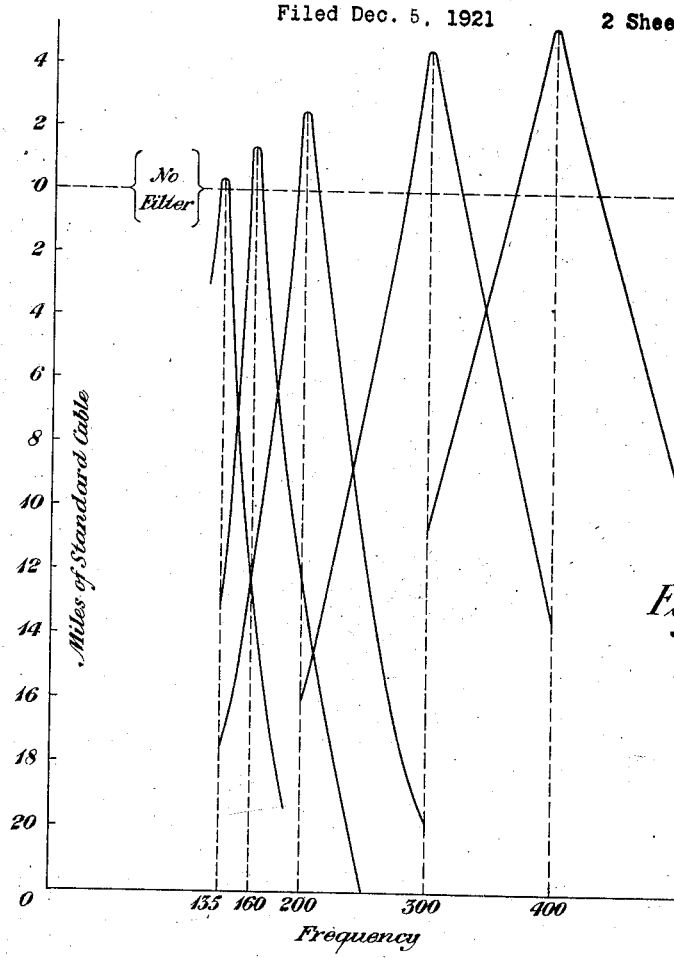
Figure 4:
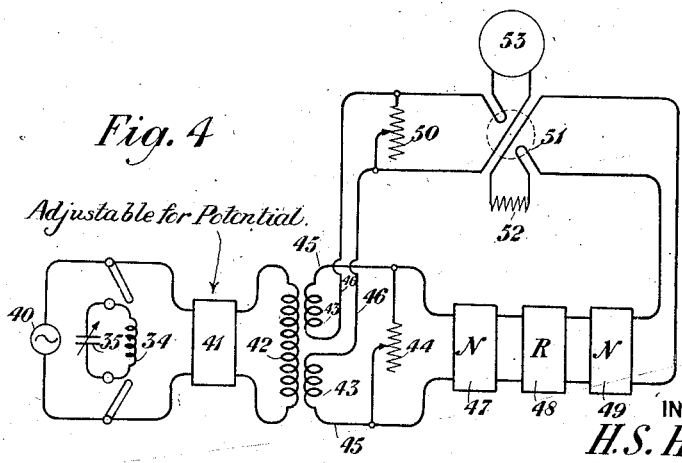

Referring to the drawings, Figure 1 is a general diagram of apparatus for measuring the transmission efficiency of a geographically extended line; Fig. 2 is a detail diagram of an adjustable network forming part of this system; Fig. 3 is a diagram showing transmission as a function of frequency, which will be referred to in the course of this specification, and Fig. 4 is a diagram illustrating the application of my invention in connection with the measurement of the efficiency of a repeater.

Referring to Fig. 1, the geographically extended line L connects the distant office A with the home office B and it is desired to measure its transmission equivalent. The equivalent referred to depends upon the attenuation of the current in the line and the gain of any amplifying apparatus. It is commonly measured in "standard miles." A standard mile is a mile length of cable pair of certain dimensions and constants which are well known, and a loss or attenuation of a certain number of standard miles is the loss or attenuation that would be produced on a circuit of that number of miles of such cable pair. Similarly a gain of a certain number of standard miles is the effect produced by removing that number of miles.

1 and 1' are similar alternating current generators of the same frequency whose output may be controlled by the adjustable resistances 2 and 2'. The measuring instruments 5 and 5' are alike. The impedance of the device 4 is very low compared to the impedance of the circuit comprising the elements 7 and the line under test, so that a very large fraction of the secondary current of transformer 3 flows through the resistance 4. The potential across the terminals of resistance 4 is, therefore, practically independent of the impedance of the line under test. A similar transmitting apparatus *b* is located at office B. The resistances 4 and 7 at office A, and 4' and 7' at office B are adjusted to make the characteristic impedance the same looking in and out of the line L at the respective offices, and this is done in such a way as to make resistances 4 and 4' equal. Then the resistances 2 and 2' are adjusted to make the instruments 5 and 5' read the same.

When the switch 9 is in the position shown in full lines a certain current, due to a certain electromotive force, is received from the alternator 1'. When the switch 9 is thrown to the dotted line position the current is the same except as it is attenuated by the interposed line L. Further structural features shown in Fig. 1 will be apparent from the diagram or will be explained in the following description of the operation of the apparatus.

With the switches in the positions shown in full lines in the drawing the risistances 4' and 7' and the secondary of the transformer 8 are adjusted to correspond approximately to the impedance of the line L. Current due to the generator 1' then flows through the calibrating line 12, amplifier 16, filter 17, another amplifier 18, another amplifier and current limiting device 19, rectifier 20 and measuring instrument 21. The potential impressed at the sending end of the apparatus is proportional to the reading of the meter 5' and the current transmitted is indicated by the reading of meter 21. The current from the generator 1' is regulated by resistance 2' until the meter 5' indicates a current of any convenient arbitrary value and the potentiometer 15 is adjusted until the pointer of meter 21 stands at a predetermined position, say the middle of the scale.

The receiving apparatus having thus been calibrated, switches 9, 11 and 14 are thrown to their dotted line positions so that current from the distant office A comes over the line L to the switch 9, then through the network 13, and the rest of the way as before to the meter 21. The resistance 4 is made equal to resistance 4', and resistance 2 is adjusted until the reading of meter 5 is the same as the previous reading of meter 5'; thus it is known that the voltage impressed on the line at the distant office A is the same as was the voltage impressed on the measuring apparatus at the home office B for calibration.

The adjustable measuring line 13 is constructed to have the same transmission equivalent as the calibrating line 12 when the associated dial indicates zero; that is, when the rotatable contactor 13ª is thrown to the opposite extreme from that indicated in Fig. 1, the transmission equivalent for the line 13 will be the same as for the line 12. The calibration for the device 13ª is in standard miles and gives the number of miles that are cut out from the line 13 as the adjustment is made toward that shown in the figure. The impedance of the line 13 is constant at all adjustments and the same as for the line 12.

It is assumed that when the switches 9, 11 and 14 were thrown the contactor 13ª was at the position which made the transmission loss the same for the line 13 as for the line 12. Accordingly, the throw of the switches merely changed conditions by the introduction of the line L; this caused a certain transmission loss so that less current than before got through to the measuring instrument 21. The contractor 13ª is now rotated so as gradually to reduce the attenuation loss in the line 13 until the reading of the instrument 21 is restored to the value it had before the switches 9, 11 and 14 were thrown. This means that the loss in line L is compensated by reduction of loss in the line 13 and this loss is read off directly in standard miles on the scale that cooperates with the rotating contactor 13ª.

The filter 17 is a high pass filter which will have its critical or cut-off frequency at a point somewhere within the lower part of the essential voice frequency range, say at about 500 cycles per second. Most interfering frequencies are lower than this, so that any such lower frequencies will be shunted out by the filter 17 and will not affect the reading of the instrument 21. With the filter 17 connected as just explained, of course only frequencies above its critical frequency can be employed at the generators 1 and 1'.

For certain purposes it may become desirable to measure the transmission efficiency of the line L at frequencies below 500 cycles per second. For the purpose of making such measurements of such lower frequencies, I have provided the filter 34—35 to be employed in place of the filter 17. By throwing the six switches 26, 27, 28, 29, 30 and 31, the filter 17 is cut out, likewise the resistance 32, and the condenser 33 is connected in series, and the filter combination 34—35 is connected in shunt. The purpose of the condenser 33 is to prevent the formation of a circuit to the right through which continuous current might flow from the plate battery for the audion amplifier 16.

The filter 34—35 is shown more in detail in Fig. 2. It consists of an inductance coil 34 and a series of condensers 35' and 35'', of which 35' is permanently connected in parallel and the others may be connected likewise by means of the switches 36.

With all the switches 36 open, the combination 34—35 is resonant at a frequency of 400. Closing the first switch 36 makes the entire combination resonant at 300. Closing, in addition, the second switch 36 determines the resonant frequency at 200, and so on, as indicated by the legends at the lower part of Fig. 2. The diagram in Fig. 3 shows the gain (or loss) produced by introducing the filter 34—35, as a function of frequency for each of the five adjustments of the filter of Fig. 2. It will be seen that the filter is very sharply selective. At the precise indicated frequency for each adjustment there is a certain transmission which falls off rapidly as the frequency deviates on either side. Accordingly, it is important that the generators 1 and 1' shall operate accurately at whichever of the five frequencies the switches 36 are set in Fig. 2.

When testing for the transmission at any one of these frequencies, if an extraneous interfering frequency gets on the line L, it will be practically eliminated at the filter 34—35, unless it happens to be almost exactly the same frequency as the one for which the test is being made. This contingency can be guarded against in several ways, one of which is to notice whether any current is received over the line L when the circuit of the generator 1 is opened as at 2 in Fig. 1.

Interfering frequencies are mostly in the range below 500 cycles per second, and hence a mere high pass wave filter like 17 is sufficient for tests above that frequency, but when one is making tests below that frequency, he is operating in a range such that interference may be encountered at frequencies either above or below the test frequency, and therefore, a filter of the type indicated by 17 will not be suitable, but a filter such as 34—35 with narrow sharp selectivity, will be advantageous, as pointed out.

On long telephone transmission lines it is common to transmit ringing current at a frequency of 135 cycles per second. Heretofore, at repeater stations, this ringing current has been shunted around the repeaters and made to actuate selective relays. But it is becoming the practice to some extent to send the ringing current right through the repeaters, and this is one reason why it may be desirable to test the transmission efficiency of a line, including its repeaters, at a frequency below 500 cycles per second, and in this case particularly at 135 cycles per second.

In alternating current telegraph work, the transmission of low frequencies within the range indicated by the legends on Fig. 2 becomes a matter of interest and the determination of the transmission at these frequencies can be made by means of my invention, involving the use of the filter 34—35.

In Fig. 4 I have illustrated the use of a narrowly selective filter in connection with apparatus for testing repeater gain. The generator 40 sends out current of desired frequency through a network 41, having a potentiometer adjustment, to the primary 42 of a transformer having a divided secondary 43. The circuit of one pair of conductors 45 goes from the secondary 43 through an appropriate network 47 to the input side of the repeater 48 whose output side is connected through the network 49 to the switch 51.

The circuit of the other pair of conductors 46 from the transformer secondary 43 goes also to the switch 51. Across the conductors 45 is an adjustable resistance 44 and across the conductors 46 is a similar adjustable resistance 50. Both these adjustable resistances 44 and 50 are calibrated in standard miles. The switch 51 connects two circuits from the respective conductor pairs 45 and 46 alternatively with the measuring instrument 53 and the resistance 52. The resistance 52 is made equal to the resistance of the measuring instrument 53. The networks 47 and 49 are provided in order to equalize the impedance for various repeaters 48 that may be inserted for test.

When it is desired to test the repeater 48 for its transmission at a particular frequency, then the generator 40 should give that frequency without harmonics. It may not be an easy matter to provide a generator that will give a pure frequency, and to guard against this, the filter 34—35 is introduced as shown, next to the generator 40 in Fig. 3. This will shunt out the harmonics so that there will be transmitted to the transformer primary 42 only pure alternating currents of the single frequency desired.

By adjustment of the calibrated resistances 44 and 50, whose readings are added, the result is attained that the instrument 53 reads the same, no matter which way the switch 51 is thrown. This means that the gain due to the repeater 48 is balanced by loss at 44 in addition to the loss at 50, so that the gain can be read off from the calibrations at 44 and 50 as already described.

I claim:

1. In combination, apparatus whose transmission efficiency is to be measured at a particular frequency below the essential voice frequency range, a source of current at that frequency applied to such apparatus at one end, an indicator to show the magnitude of the transmitted current and thus to indicate the transmission efficiency, and means to shunt out from said indicator substantially all currents of frequency different from that of said source.

2. The method of measuring the transmission efficiency of apparatus at a particular frequency below the essential voice frequency range, which consists in applying current of that frequency to one end of such apparatus and measuring the current transmitted to the other end thereof, and shunting out all fortuitous currents of other frequencies than the particular frequency for which it is desired to make the measurement.

3. Apparatus for measuring the transmission efficiency of a line comprising like alternating current sending apparatus at the distant end of the line and at the home end thereof, adjustable means at the home end to compensate the loss in shifting from the home sending apparatus to the distant sending apparatus, an indicator at the home end, and means to shunt out from that indicator all currents differing in frequency from the fundamental frequency of the alternating current apparatus at the two ends of the line, said apparatus at the two ends of the line having a fundamental frequency below the essential voice frequency range.

4. The method of measuring the transmission efficiency of a line at a particular frequency below the essential voice frequency range, which consists in applying to an indicator alternatively current generated by like generators at the home end of the line and at the distant end observing the equivalent network whose loss compensates for the loss due to the interposed line applying the currents in both cases to an indicator, and shunting out from that indicator currents of all frequencies other than that for which it is desired to make the test.

5. In combination, apparatus whose transmission efficiency is to be measured at a particular frequency below the essential voice frequency range, a source of current at that frequency applied to such apparatus at one end, an indicator to show the magnitude of transmitted current and thus to indicate the transmission efficiency, and a shunt parallel resonant to the frequency at which the test is made, whereby currents of other frequency are shunted out and only currents of that particular frequency are transmitted to the indicator.

6. In combination, apparatus whose transmission efficiency is to be measured at a particular frequency, a source of current at that frequency applied to such apparatus at one end, an indicator to show the magnitude of transmitted current and thus to indicate the transmission efficiency, and a coil and an adjustable condenser each in shunt relation to said indicator, whereby currents of other frequencies than that to which the coil-condenser combination is parallel-resonant are shunted with respect to said indicator.

In testimony whereof, I have signed my name to this specification this 2nd day of December, 1921.

HAROLD S. HAMILTON.